Patented Nov. 24, 1931

1,833,809

UNITED STATES PATENT OFFICE

WILLIAM GRAHAM WOODCOCK, HUGH ALBERT EDWARD DRESCHER, ERNEST GEORGE BECKETT, AND JOHN THOMAS, OF GRANGEMOUTH, SCOTLAND, ASSIGNORS TO SCOTTISH DYES, LIMITED, OF GRANGEMOUTH, SCOTLAND

PURIFICATION OF 1-AMINO-2-CHLOR-ANTHRAQUINONE

No Drawing. Original application filed September 24, 1926, Serial No. 137,624, and in Great Britain October 3, 1925. Divided and this application filed July 6, 1929. Serial No. 376,485.

This invention relates to the manufacture of 1-amino-2-chlor-anthraquinone.

It has for its object to provide a process for the preparation of this body in substantially pure form.

In co-pending application No. 137,624 filed on September 24, 1926, there is described among other processes a method of separating into its different constituents a mixture of halogen-amino-anthraquinones obtained by condensing (3'-amino-4'-halogen)-2-benzoyl-benzoic acid. This method of separation is based on the different solubility of the two constituents in sulphuric acid of different concentrations. The isomer that separates out from 80 per cent. sulphuric acid, after ring formation is complete, appears to consist in the case of the chlorine derivative of 2-amino-3-chlor-anthraquinone. On diluting the mother liquors further a second isomer is obtained which appears to consist of 1-amino-2-chlor-anthraquinone.

We have found that crude 1-amino-2-chlor-anthraquinone can be purified by recrystallizing from organic solvents or, for example, by recrystallizing from 70 per cent. sulphuric acid.

Sulphuric acid is known as a medium for crystallization in certain cases. It has been applied to the separation of 1-amino-2-chlor-anthraquinone and 2-amino-3-chlor-anthraquinone and also there have been several cases of the purification of vat dyestuffs from sulphuric acid. There is an element of surprise in the fact that anthraquinone-1-amino-2-chlor can be purified by recrystallization from sulphuric acid in the fact that it is a strong basic substance and therefore of high solubility in acid and it could not be expected that it could easily be precipitated from the sulphuric acid, especially to obtain a high yield. In the separation of 2-amino-3-chlor-anthraquinone and 1-amino-2-chlor-anthraquinone use may be made of the solubility of the 1-amino-body in order to separate the 2-amino one by adding water until the 2-amino-3-chlor precipitated out while the 1-amino-2-chlor remained in solution, the 1-amino-2-chlor afterwards being recovered by drowning in water and filtration. In the separation of 2-amino-3-chlor-anthraquinone from 1-amino-2-chlor-anthraquinone in 80% acid referred to above, the acid is first diluted to 80% when the 2-amino-3-chlor-anthraquinone is separated off. After this separation it is necessary to dilute the acid much further, preferably to about 50% to cause the 1-amino-2-chlor-anthraquinone to separate.

In the face of the above, it is not to be expected that it should be possible to purify anthraquinone-1-amino-2-chlor by precipitating it from sulphuric acid, for example of strength about 70%. It is in fact a matter of definite surprise that 1-amino-2-chlor can be purified in this way.

But turning now to the purification of a 1-amino-2-chlor-anthraquinone, containing traces of 2-amino-3-chlor-anthraquinone and prepared as for example by ring-closing 3'-amino-4'-chlor-2-benzoyl-bonzoic acid with sulphuric acid followed by dilution of the acid for the separation of the major part of the content of the 2-amino-3-chlor-anthraquinone. After dissolving the crude 1-amino-2-chlor-anthraquinone in 94% acid and starting to dilute to 70%, the strength of 80% must be passed intermediately. When this strength of 80% is reached, the traces of 2-amino-3-chlor-anthraquinone present, however, are not precipitated, as might be expected, and on diluting further, as soon as 70% acid is reached, the 1-amino-2-chlor-anthraquinone separates out practically completely, while the traces of 2-amino-3-chlor-anthraquinone still remain in solution.

To recapitulate, in the first separation the 2-amino-3-chlor-anthraquinone comes out first, and it is necessary to dilute to about 50% before the 1-amino-2-chlor-anthraquinone can be got out, whereas in the second purification, which is the one with which the present application is concerned, the 1-amino-2-chlor-anthraquinone comes out first and moreover it comes out from acid as strong as 70%.

The invention in brief consists in a method of preparing substantially pure 1-amino-2-chlor-anthraquinone which comprises mixing 1 part of crude 1-amino-2-chlor-anthraquinone with sufficient concentrated sulphuric acid to dissolve it at a temperature of about 90° C., and heating the mixture to that approximate temperature, adding water to reduce the strength of acid to about 70%; cooling to about 80° C. and filtering at substantially this temperature.

In carrying the invention into effect in one form by way of example, 1 part of crude 1-amino-2-chlor-anthraquinone as referred to herein is dissolved in 4 parts of concentrated sulphuric acid (94-97 per cent.) at 90° C. The solution is diluted at this temperature with water so as to bring the strength of the acid down to 70 per cent. sulphuric acid. It is then allowed to cool to 80° C. and kept at this temperature until the sulphate of pure 1-amino-2-chlor-anthraquinone separates out. Sufficient time is then allowed for the material to crystallize (say about half to one hour), and the sludge is filtered quickly at the same temperature. If crystallization does not start immediately the solution is seeded with some of the pure compound.

The cake is washed with hot 70 per cent. sulphuric acid, then boiled with water, filtered and washed free from acid.

The crude 1-amino-2-chlor-anthraquinone referred to herein may for example be such as results from the process of ring-closing 3'-amino-4'-chlor-2-benzoyl-benzoic acid with sulphuric acid followed by dilution for the separation of the major part of the content of 2-amino-3-chlor-anthraquinone in which case it may contain some 2-amino-3-chlor-anthraquinone with other impurities.

Having now described our invention, what we claim as new and desire to secure by Letters Patent is:—

The step in a method of preparing substantially pure 1-amino-2-chlor-anthraquinone, which comprises mixing 1 part of crude 1-amino-2-chlor-anthraquinone with sufficient concentrated sulphuric acid to dissolve it at a temperature of about 90° C., heating the mixture to that approximate temperature, adding water to reduce the strength of acid to about 70%, cooling to about 80° C. and filtering at substantially this temperature.

In testimony whereof we have signed our names to this specification.

WILLIAM GRAHAM WOODCOCK.
HUGH ALBERT EDWARD DRESCHER.
ERNEST GEORGE BECKETT.
J. THOMAS.